(12) United States Patent
Fallas et al.

(10) Patent No.: US 6,540,063 B1
(45) Date of Patent: Apr. 1, 2003

(54) CONVEYOR ASSEMBLY FOR PROVIDING SELECTIVELY SPACED PRODUCTS

(76) Inventors: David M. Fallas, 3120 Inverness Dr., Waco, TX (US) 76710; Richard J. Fallas, 335 Harrowgrove Ct., Alpharetta, GA (US) 30022

(*) Notice: Subject to any disclaimer, the term of this patent is extended or adjusted under 35 U.S.C. 154(b) by 0 days.

(21) Appl. No.: 09/594,533

(22) Filed: Jun. 14, 2000

(51) Int. Cl.[7] ............................................. B65G 47/31
(52) U.S. Cl. .............................. 198/461.1; 198/460.1; 198/464.1; 198/437; 198/419.3
(58) Field of Search .............................. 198/431, 464.1, 198/463.2, 418.7, 437, 444, 358, 369.5, 370.1, 419.2, 460.1, 461.1

(56) References Cited

U.S. PATENT DOCUMENTS

| | | | |
|---|---|---|---|
| 4,846,336 A | * 7/1989 | Hoyland et al. | 198/436 X |
| 4,867,299 A | * 9/1989 | Fukuoka et al. | 198/463.3 X |
| 4,991,708 A | * 2/1991 | Francioni | 198/419.2 |
| 5,186,306 A | * 2/1993 | Sjostrand | 198/437 X |
| 5,692,593 A | * 12/1997 | Ueno et al. | 198/464.1 X |
| 6,003,284 A | 12/1999 | Goodman | |
| 6,061,996 A | 5/2000 | Vissers et al. | |

FOREIGN PATENT DOCUMENTS

JP 55-44489 * 3/1980 .............. 198/461.1

OTHER PUBLICATIONS

Robert Bosch, "GSH 5030: High-performance multi-bag packer, output of up to 180 bags per minute, independent of the pack pattern", Bosch Information Leaflet.

* cited by examiner

Primary Examiner—James R. Bidwell
(74) Attorney, Agent, or Firm—Thompson & Knight, LLP

(57) ABSTRACT

A conveyor assembly is disclosed for providing selectively spaced products for packing in cases. The conveyor assembly includes a feed conveyor belt for supplying products and first and second pick conveyor belts. A diverter conveyor belt is disposed between the feed conveyor belt and the first and second pick conveyor belts, and adapted to selectively align the feed conveyor belt with either the first pick conveyor belt or the second pick conveyor belt. A first pick motor is operatively associated with the pick conveyor belt for selectively controlling the speed of a first pick conveyor belt. A second pick motor is operatively associated with the second pick conveyor belt for selectively controlling the speed of the second pick conveyor belt. A sensor is operatively associated with the diverter belt for sensing product on the diverter belt. A controller is operatively connected with the sensor and the first and second pick motors for selectively varying the speed of the first and second pick motors to provide a desired spacing of products on the first and second pick conveyor belts.

15 Claims, 5 Drawing Sheets

CONVEYOR ASSEMBLY FOR PROVIDING SELECTIVELY SPACED PRODUCTS

BACKGROUND OF THE INVENTION

Field of the Invention

The invention relates generally to case packing apparatus. More particularly, it concerns an improved conveyor apparatus for providing accurately and selectively spaced product for handling by a case packer.

A problem encountered in product handling today is presented by the need to safely move a high quantity of product from a conveyor belt into one or more shipping containers in an efficient and orderly fashion. This problem is accentuated by today's high speed packaging machines and high speed conveyor belts that are capable of producing and moving a very high quantity of products, such as bagged products, along a conveyor belt to a case packer for movement into the boxes or cases. In particular, while the packaging machines and conveyor systems are capable of producing and providing a large quantity of product rapidly to a case packer, the loading process often bogs down because the case packers cannot load the cases as rapidly as the product can be supplied. An obvious solution is to purchase multiple case packers and route product to the various case packers. While this solution is "obvious," the extreme expense of such a solution is also obvious. It is therefore desirable to increase the efficiency of the case packers so that each case packer can handle greater quantities of product.

One of the problems encountered by the case packers exists because the timing of the supply of products on a conveyor belt is too rapid for the loading apparatus. Current equipment often uses gantry robot vacuum head assemblies to lift products from a conveyor belt and deposit the products in a case. These assemblies, however, generally require that the product be stopped on the conveyor belt so that the product can be picked up and placed. The stoppage of product, lifting of product, and placing of product usually takes more time than is permitted by the spacing of the product on a feed conveyor belt.

Another common problem encountered in loading products such as bagged products using loading mechanisms such as gantry robots having a plurality of vacuum heads is that the bags of product must be properly spaced on the conveyor belt to ensure that each bag is lined up underneath a respective vacuum head when the vacuum heads are lowered to pick up the products. Such accurate spacing is seldom presented by the normal operation of the conveying system within a manufacturing plant. It is therefore necessary to provide a conveying apparatus that will cause the packages to have the required selective spacing.

Accordingly, it is desirable to provide a conveying system that delivers bags to a loading area wherein the bags have an accurate and desired spacing for handling. It is still further desirable to provide an apparatus that can provide bags having such spacing, while at the same time handling the high quantity of bags currently encountered and desired in many package handling environments.

SUMMARY OF THE INVENTION

The present invention provides such a conveyor apparatus for spacing the product through the provision of a conveyor assembly for providing selectively spaced products for packing that includes a timing conveyor belt comprising a first motor for driving the timing conveyor belt. A pick conveyor belt including a pick motor for selectively driving the pick conveyor belt is operatively aligned with the timing belt for receiving product from the timing belt. A sensor is operatively associating with the timing conveyor belt and adapted to sense the arrival of each product on the timing conveyor belt. A controller is operatively connected to the first motor, the pick motor, and the sensor and is adapted to vary the speed of the pick motor (and the pick conveyor belt thereby) relative to the speed of the first motor (and the timing conveyor belt thereby) to provide selective spacing between products on the pick conveyor belt.

In a preferred aspect of this embodiment, the controller repeatedly increases or decreases the speed of the pick motor in response to the presence or absence of product on the timing conveyor belt in order to adjust the travel of the pick conveyor belt to provide the desired spacing.

In an alternative embodiment of the present invention adapted for higher speed supply of product, a conveyor assembly is provided for supplying accurately and selectively spaced products for packing cases. The conveyor assembly includes a feed conveyor belt for supplying products, and first and second pick conveyor belts. A diverter conveyor belt is positioned between the feed conveyor belt and the first and second pick conveyor belts and adapted to selectively route products from the feed conveyor belt to the first pick conveyor belt or to the second pick conveyor belt. A first pick motor is operatively connected with the first pick conveyor belt for controlling the speed of the first pick conveyor belt. A second pick motor is operatively connected with the second pick conveyor belt for controlling the speed of the second pick conveyor belt. A sensor, such as a photo cell, is operatively associated with the diverter belt for sensing each product as it passes over a selected point on the diverter conveyor belt. The conveyor assembly further includes a controller operatively connected to the sensor, to the first pick motor, and to the second pick motor for selectively varying the speed of the first and second pick motors to provide a desired spacing of products on the first and second pick belts.

In a preferred aspect of this embodiment of the invention, the first and second pick belts are positioned substantially parallel to each other. The diverter conveyor belt is then adapted to selectively align the conveyor belt with either the first pick belt or the second pick belt in order to selectively deliver product or groups of product to either the first pick belt or to the second pick belt.

In a still more preferred aspect of this embodiment of the present invention, the conveyor assembly further includes a first diverter motor operatively associated with the diverter conveyor belt for controlling the speed of the diverter conveyor belt. The controller is then also connected to the first diverter motor for selectively varying the speed of the first and second pick motors relative to the speed of the first diverter motor to provide a desired spacing of products on the first and second pick conveyor belts.

In a yet more preferred aspect of this embodiment of the present invention, the controller makes frequent periodic adjustments to the first or second pick motor speed in order to accurately adjust for random spacing of product on the feed and diverter belts.

In the most preferred aspect of the embodiment of the present invention, the conveyor assembly comprises a gantry robot vacuum head assembly including a plurality of robot vacuum heads selectively spaced in a line. The assembly is adapted to move sequentially from a first position over the first pick belt to a second position over a row of cases and then to a third position over the second pick belt, following which it returns to substantially the second position over the row of cases. The sequence allows the gantry robot vacuum head assembly to lift products off the first pick belt and deposit them into cases, and then lift products off the second pick belt and deposit them into cases.

Accordingly, by diverting a selected number of products first to the first belt, where the products are selectively spaced and stopped for loading, and then to the second pick belt where the products are selectively spaced (while the first set of products are being removed from the first pick belt), the apparatus of the present invention allows essentially continuous feed of products at a very high speed for removal and loading by a gantry robot vacuum head assembly. In particular, the use of two pick belts allows a first row of products to be positioned on the first pick belt, after which the first pick belt is momentarily stopped to allow the gantry robot assembly to remove and place the product into cases. While the gantry robot vacuum head assembly is placing the product in the cases, product is still being fed, albeit to the second pick belt, where the product is again accurately and selectively spaced for the gantry robot vacuum head assembly. The gantry robot assembly then moves to the product on the second pick belt while product is being fed to the now vacant first pick belt. This process is repeated until a desired quantity of product is packed into the cases.

Accordingly, the present invention also provides a method for packing cases with products. The method comprises the steps of (a) transporting a plurality of products on a feed conveyor belt to a diverter conveyor belt. The product is then sensed at a selected point once it is on the diverter conveyor belt. The diverter conveyor belt is aligned with a first pick belt for delivery of a selected number of products to the first pick belt. The first pick belt is advanced at a desired speed determined by the speed of the diverter conveyor belt and the desired spacing between products on the first pick belt. Once the desired quantity of products have been delivered to the first pick belt and selectively spaced, the diverter belt is then aligned with a second pick belt while the first pick belt is stopped. The second pick belt is advanced to the desired speed to provide selective spacing between the products in the same manner that the first pick belt was advanced—and the speed of the second pick belt depends upon the spacing of product on the diverter belt, the speed of the diverter belt and the desired spacing on the second pick belt. At the same time, the products on the first pick conveyor belt are lifted from the first pick conveyor belt and placed in cases and the first pick conveyor belt is restarted. Once the desired quantity of products has been delivered to the second pick conveyor belt, the diverter belt is then shifted back to the first pick conveyor belt while the second pick conveyor belt is stopped. The first pick conveyor belt is then advanced at a desired speed to provide the selected spacing using the same parameters as before when spaced product was provided to the first pick conveyor belt. At the same time, the products on the second pick conveyor belt are removed from the second pick conveyor belt and placed into cases. This process of alternating the supply of product between the first pick conveyor belt and the second pick conveyor belt is repeated until the desired quantity of product is loaded into the cases.

Accordingly, the present invention provides a conveyor assembly that allows essentially continuous feed of product at a high speed to a case packing apparatus such as a gantry robot assembly, while at the same time providing selective and accurate spacing for such product suitable for use of a gantry robot vacuum head assembly.

These and other advantages of the present invention will be more fully appreciated by the following detailed description of the invention.

BRIEF DESCRIPTION OF THE DRAWINGS

This invention will be further illustrated by the appended drawings which illustrate a particular embodiment of the conveyor assembly in accordance with the present invention.

DETAILED DESCRIPTION OF THE PREFERRED EMBODIMENT

It will be understood that the present invention can be implemented in a number of different ways within the scope of the claims appended hereto. A presently preferred embodiment of the invention will now be described below.

Figure 1:
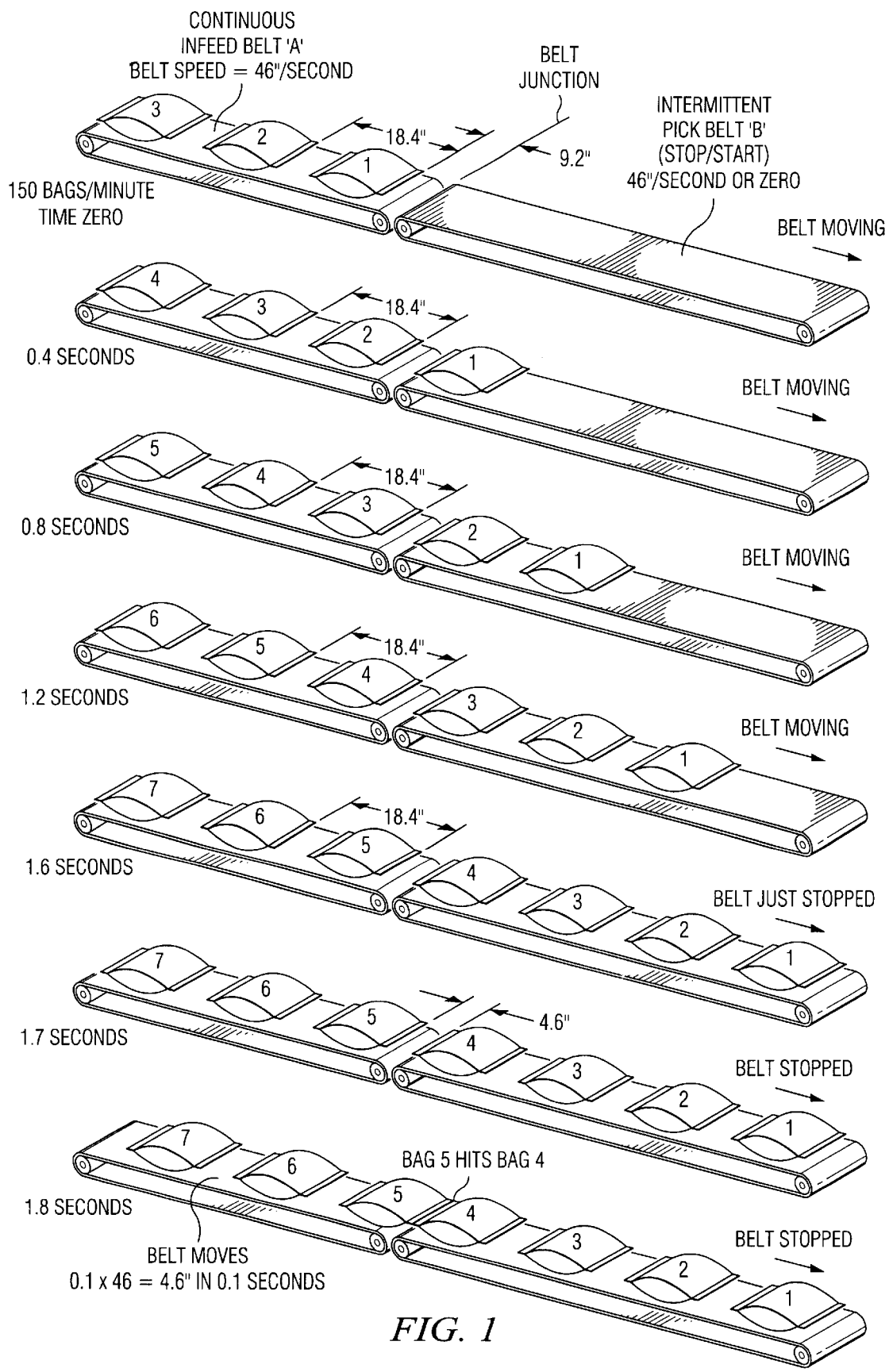
FIG. 1 is a schematic figure illustrating the problems encountered in applications wherein product is supplied on conveyor belts at a very high speed.

Referring first to FIG. 1, the apparatus of the present invention is intended to address packaging environments wherein bagged products are provided on conveyor belts in high quantity at a relatively high speed. When provided at such speeds, it has been found that the spacing between the bags is not always uniform and that the spacing is small enough such that adequate time may not be provided between bags to allow certain apparatus, such as gantry robot vacuum head assemblies, to remove bags from a belt before additional bags hit them.

In particular, when it is desired to remove bagged products from a belt using vacuum heads, current technology does not allow the vacuum heads to move with the belt for sufficient distance to be certain of acquiring a sufficient vacuum to lift and deposit a piece of product. It is therefore necessary to intermittently stop the belt to allow the vacuum heads to come down onto the product to pick and lift the product and deposit it in a box or crate. (See FIG. 3.) When product is moving slowly and widely spaced, this problem may be addressed by simply delivering a selected quantity onto a separate belt and stopping that belt for a long enough time to allow the product to be lifted and removed from the belt. If the spacing is not great enough, however, then the next bag on the incoming feed belt will interfere with the removal process and/or be held in place in a manner that alters the spacing between it and the next bag on the belt.

Referring again to FIG. 1, such a situation is illustrated. In the example shown in FIG. 1, it was projected that the infeed belt would move at 230 feet per minute (46 inches per second) and would carry approximately 150 bags per minute. This means that the bags carried on the infeed belt would be spaced approximately 18.4 inches apart (assuming uniform spacing—a condition that often does not exist). This means that the centers of the bags are essentially 0.4 seconds apart. Under current technology, it is not possible to remove a plurality of bags using a gantry robot assembly to vacuum lift the bags within the time allowed by this spacing. Accordingly, if the intermittent pick belt B shown in FIG. 1 is stopped to allow removal of the bags, then the next bag on the infeed belt A will hit the last bag on the pick belt B before the bag is removed. Obviously, this is not a desirable condition.

Moreover, the spacing of bags on the infeed belt A is seldom the same as the spacing of the vacuum heads on a gantry robot assembly. It is therefore necessary to not only provide spacing between groups of products to allow for removal of groups of product from the pick belt, it is also necessary to provide accurate and desired spacing between individual pieces of product within a group of products so that the products are accurately spaced for the heads of a gantry robot assembly or similar packaging assembly.

In the preferred embodiment of the present invention, the desired spacing is supplied through the provision of a pick belt B that is moved at a desired or selected speed necessary to adjust the distance between consecutive pieces of product received from the infeed belt A to provide the desired spacing. As will be appreciated from the present disclosure, in order to provide the desired spacing, it is necessary to calculate the necessary speed of the pick belt B relative to the actual spacing of consecutive products and the speed of the infeed belt A. In particular, the necessary speed of the pick belt B will equal the desired spacing divided by the actual spacing times the speed of infeed belt A. Accordingly, by adjusting the speed of belt B relative to the speed of belt A as each piece of product advances onto belt B, adjustments in the spacing can be made to provide the desired spacing between products.

Figure 2:
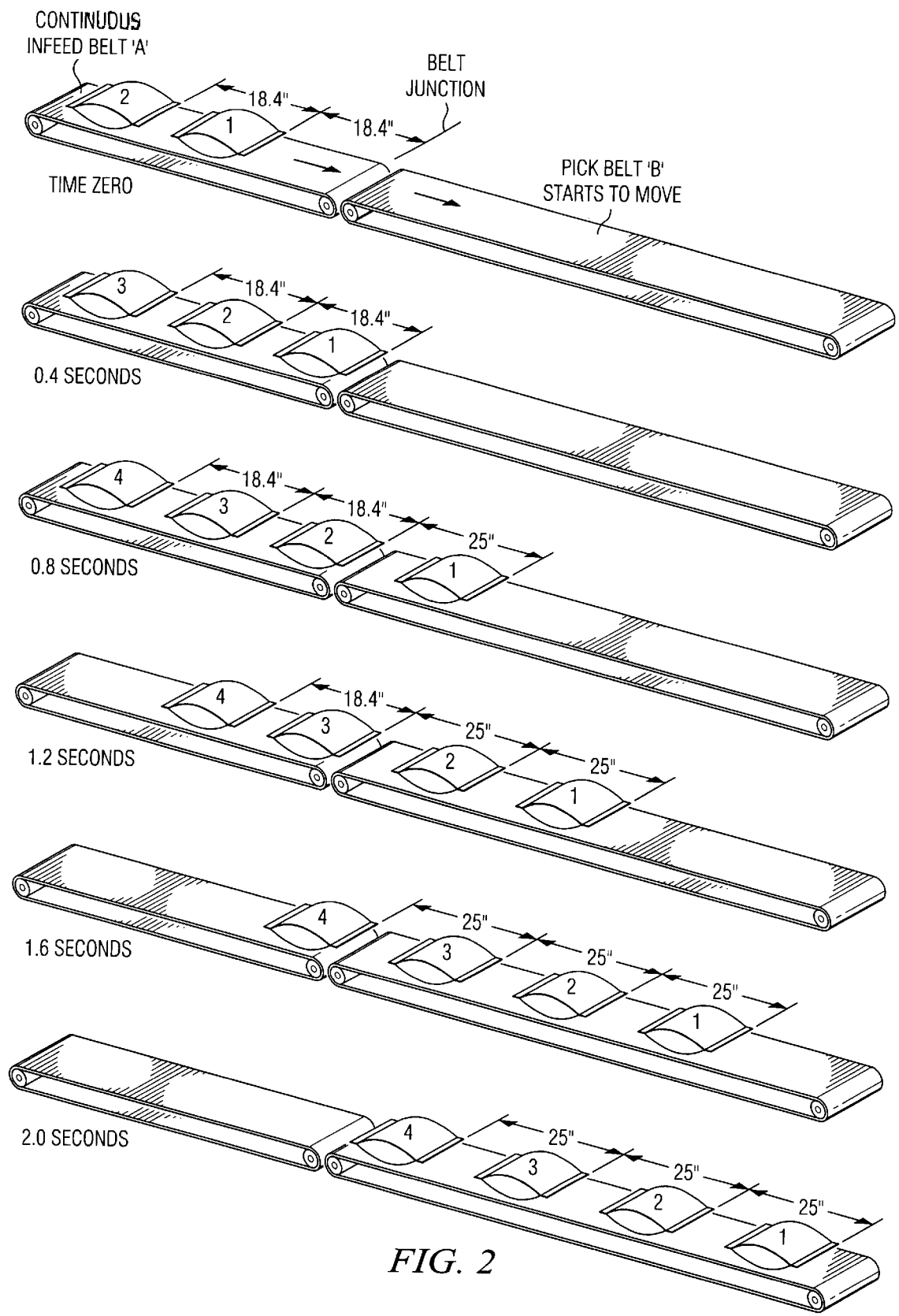
FIG. 2 illustrates schematically the spacing solution provided by the present invention.

By way of further example in order to demonstrate the theory of operation, referring still to FIG. 2, assume the following parameters: (1) bag speed of 150 bags per minute; (2) constant speed of belt "A" of 230 feet per minute which equals 46 inches per second; (3) distance between the bags on belt "A" equals 18.4 inches; and (4) the desired distance between the bags on belt "B" equals 25 inches.

Accordingly, assuming essentially constant speed and equal spacing for belt "A," then the speed at which belt "B" would need to move would be calculated as follows: distance bag "1" has to move on belt "B" (25") divided by the distance bag "2" has to move on belt "A" (18.4") times the speed of belt "A" (46 inches per second), which equals 25/18.4×46 which equals 62.5 inches/second.

Hence, by running belt "B" at 62.5 inches per second, it is possible to space the four bags on belt "B" with 25 inch centers. Of course, this example assumes uniform spacing and uniform speeds, conditions that often do not exist in the real world. As will be explained in greater detail below, an advantage of the present invention is the ability of the conveyor apparatus of the present invention to adjust for variances in spacing on the infeed belt "A" to still provide uniform spacing on the pick belt "B."

Figure 3:
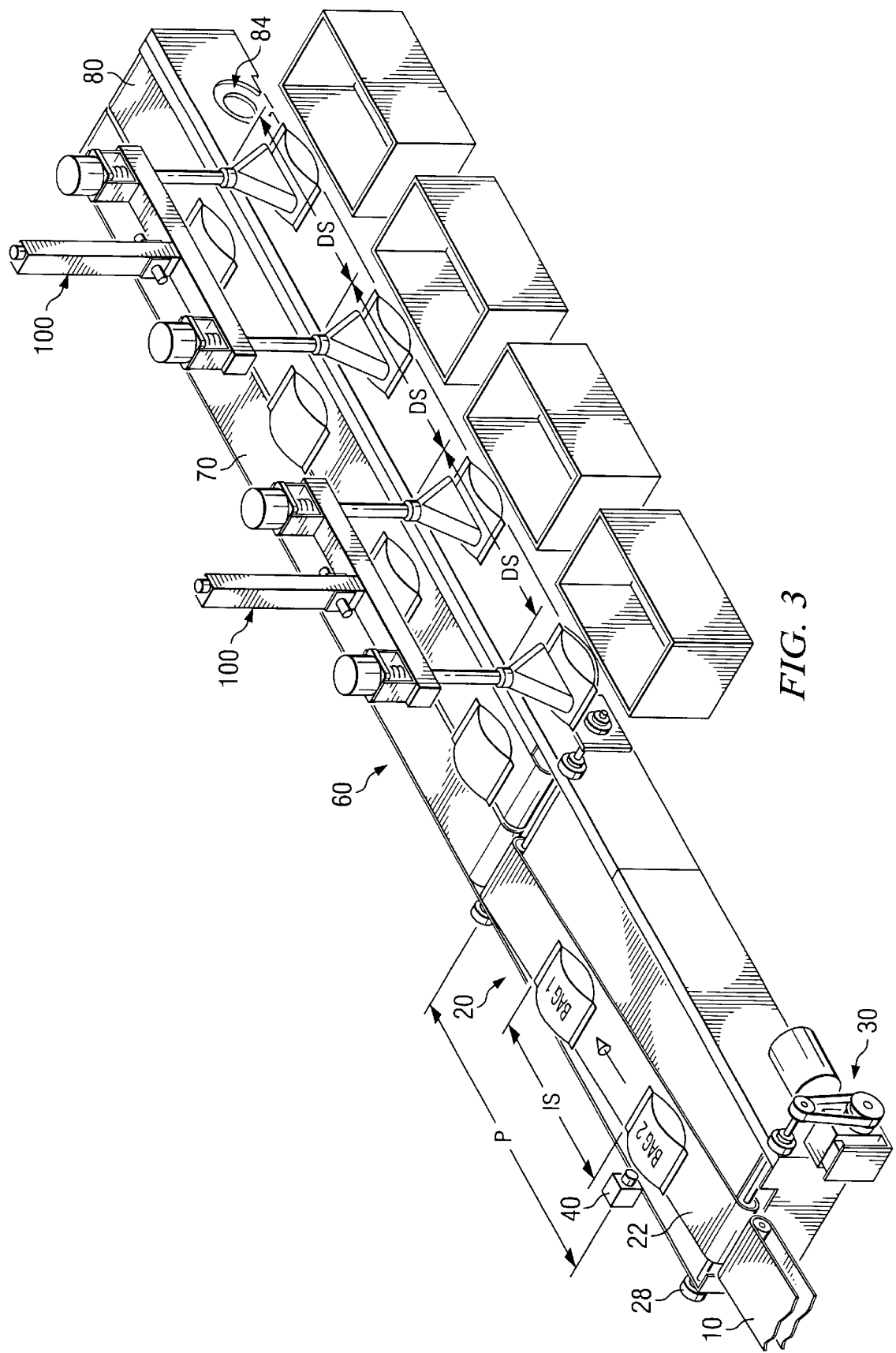
FIG. 3 is an isometric diagram of the conveyor assembly of the present invention.
Figure 4:
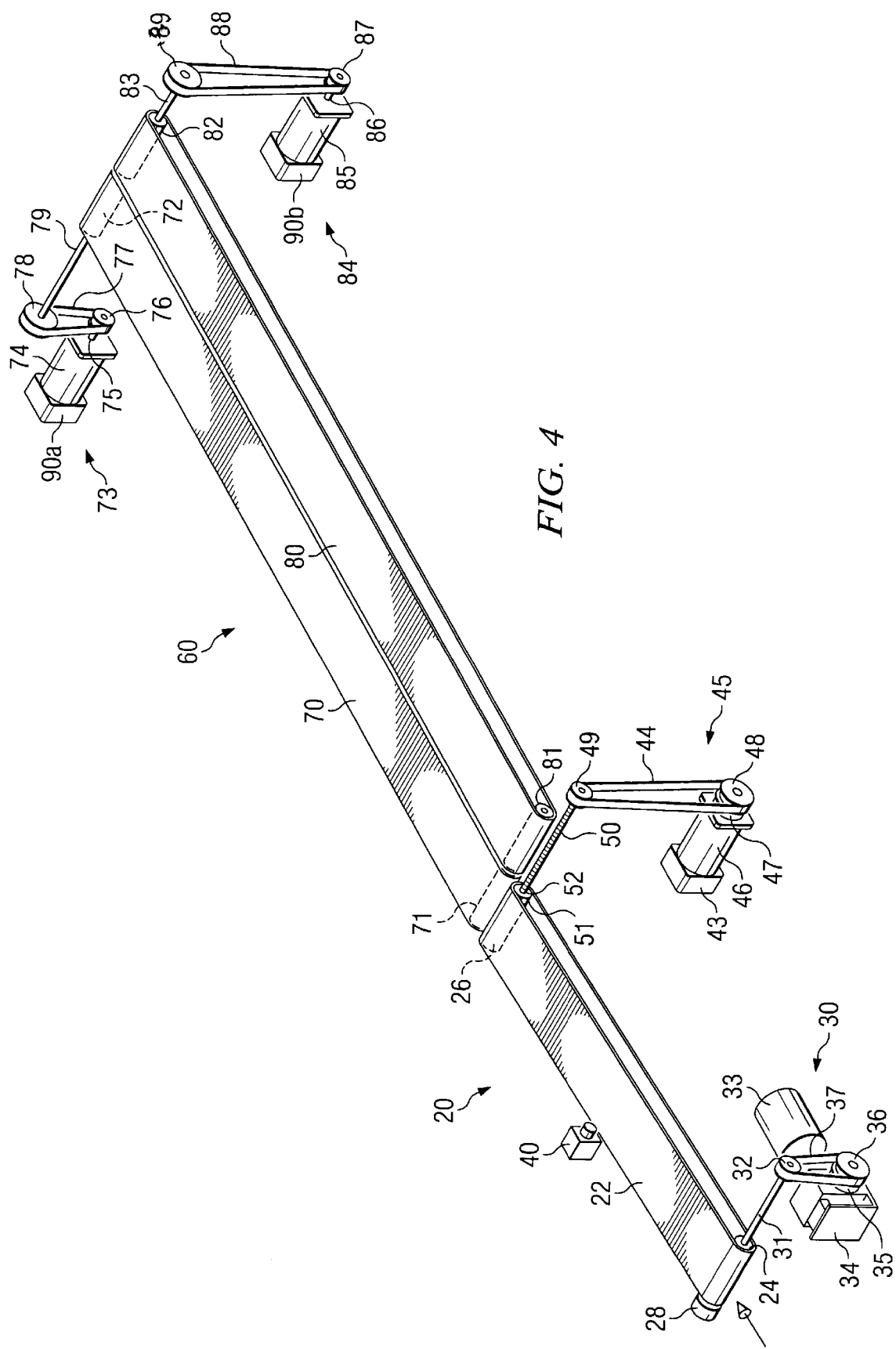
FIG. 4 is an isometric diagram of the conveyor assembly showing the diverter belt, the first and second pick belts, and the drive motors of the preferred embodiment of the present invention.

Referring now to FIGS. 3 and 4, the preferred embodiment of the present invention is shown. The preferred embodiment of the present invention is generally represented by an infeed belt 10, a diverter belt assembly 20 and a pick belt assembly 60.

The infeed belt 10 may be comprised of any of a number of conveying systems known to those skilled in the art that are suitable for supplying a known or desired quantity of product. The infeed belt 10 may represent the supply belt of any of a number of commercially available conveying systems intended for use with the conveyor apparatus of the present invention.

Referring to FIG. 4, the diverter belt assembly 20 comprises a diverter belt 22 adapted for movement to supply product to either a first pick belt 70 or a second pick belt 80. The diverter belt 22 is further adapted to be moved at a known or measured speed through means of a diverter belt drive motor assembly 30. The diverter belt assembly 20 further includes a sensor 40, such as a photocell, that is adapted to sense when product passes past a selected point on diverter belt 22. The selection of the point is not believed to be critical so long as the point is a sufficient distance "P" from the pick belts to allow sufficient time to adjust the speed of the pick belts 70 or 80 to provide desired spacing on the pick belt 70 or 80.

Referring more specifically to FIG. 4, in the preferred embodiment, the diverter belt assembly 20 includes a diverter belt 22 mounted on a drive roller 24 and an idler roller 26. The drive roller 24 is connected to the diverter drive motor assembly 30 to advance the diverter belt 22 at a known or measurable speed.

In particular, the driver roller 24 is connected to a drive shaft 31, which, in turn, is connected to a pulley 32. The pulley 32 is operatively connected to a drive motor 33 by means of a gear box 34, a gear box drive shaft 35, a pulley 36, and a drive belt 37 as shown in FIG. 4. In the preferred embodiment, the diverter belt 22 is driven by the diverter drive motor assembly 30 in a substantially continuous consistent speed in order to provide a continuous supply of product.

In order to measure the speed of the belt 22, the diverter belt assembly 20 further includes an encoder 28 mounted to the shaft 31 to measure the rotational speed of the shaft 31 and the speed of the belt 22 thereby. As shown schematically in FIG. 5, the encoder 28 is operatively connected to a controller 95 to communicate the output of the encoder 28 to the controller 95. The controller 95 may be any of a number of controllers known to those of skill in the art suitable for performing the logic functions of the present invention. In the preferred embodiment, the controller 95 is an Allen Bradley (brand) PLC SLC 5.04.

The diverter belt assembly 20 further includes a means of selectively indexing the roller 26 from alignment with the pick belt 70 to alignment with the pick belt 80 in order to selectively divert product to either the pick belt 70 or the pick belt 80. In the preferred embodiment, the indexer 45 comprises a servo motor 46 operatively connected to a servo motor drive shaft 47. A pulley 48 is mounted to the servo motor drive shaft 47 and is operatively connected to a lead screw 50 by a pulley 49 mounted to the lead screw 50 and an indexer drive belt 44 connected between the pulley 48 and the pulley 49. Accordingly, selective operation of the indexer servo motor 46 selectively rotates the lead screw 50.

The indexer 45 further comprises a lead screw nut 51 and lead screw bearings 52 mounted on the roller 26 such that rotation of the lead screw 50 causes the linear travel of the nut 51 along the lead screw 50 to index the roller 26 along the lead screw 50. As will be appreciated from the present disclosure, the servo motor 46 is adapted to be reversible in order to allow the selected indexing of the roller 26 to align with either the pick belt 70 or the pick belt 80 to selectively divert product as desired.

Figure 5:
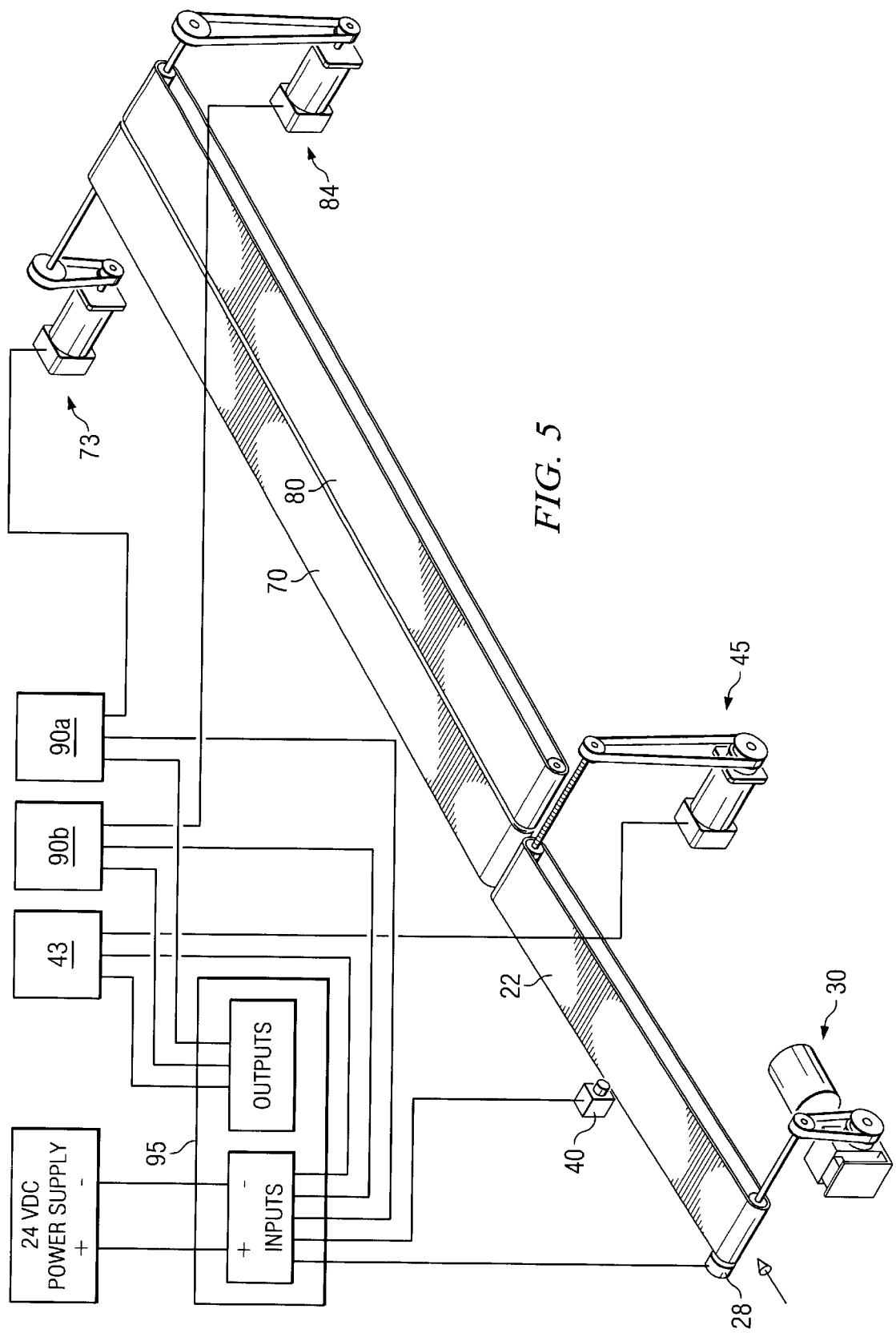
FIG. 5 is a schematic diagram of the controller circuit of the present invention.

Referring to FIGS. 4 and 5, the indexer 45 further includes a controller 43 operatively connected with the controller 95 to selectively engage the servo motor 46 to selectively index the diverter belt 22. The controller 43 may comprise any of a number of controllers suitable for effecting the selective indexing of the diverter 20. In the preferred embodiment, the controller 43 is a Pacific Scientific (brand) Servo Amp Controller.

Referring still to FIGS. 3 and 4, the pick belt assembly 60 comprises a left or first pick belt 70 and a right or second pick belt 80. First pick belt 70 is mounted on an idler roller 71 and a drive roller 72. The pick belt 70 is further connected to a first pick belt motor assembly 73 that is adapted to selectively adjust the speed of the pick belt 70 to provide desired spacing between products on the pick belt 70.

Referring now to FIG. 4, the first pick belt motor assembly 73 comprises a first pick belt servo motor 74 attached to a drive shaft 75 and pulley 76. The servo motor 74 is operatively connected to the drive roller 72 by means of a drive belt 77, connected to a pulley 78, which is mounted on the shaft 79 onto which the roller 72 is mounted. Accordingly, selective operation of the servo motor 74 causes rotation of the shaft 79 and resulting rotation of the drive roller 72 to advance the first pick belt 70.

In a similar manner, the right or second pick belt 80 is mounted to an idler roller 81 and drive roller 82. The drive roller 82 is mounted to a shaft 83. The shaft 83 is operatively associated with the second pick belt motor assembly 84 to accommodate selected adjustments to the speeds of the second pick belt 80 in order to provide the desired spacing between products on the pick belt 80. In particular, the second pick belt motor assembly 84 comprises a second pick servo motor 85 to which is connected a drive shaft 86. A pulley 87 is mounted on the drive shaft 86 and interconnected with the roller drive shaft 83 by means of a drive belt 88 and pulley 89.

Accordingly, the pick belt 70 and the pick belt 80 are each adapted with servo motors to selectively advance the pick belts 70 and 80 in order to selectively index product on the pick belts for desired spacing between the products.

Referring now to FIGS. 3, 4 and 5, the first pick belt servo motor 74 and the second pick servo belt motor 85 are each operatively connected to controllers (shown schematically as 90a and 90b) on FIGS. 3, 4 and 5 to monitor the operation of the respective servo motors in order to selectively adjust the operation of the servo motors to provide the desired indexing of the respective pick belts 70 and 80. The respective controllers 90a and 90b are, in turn, operatively connected to the controller 95 to provide the necessary input to the controller 95 and to receive the necessary output from the controller 95 for coordination of the selective movement consistent with the disclosure of the present invention. In the preferred embodiment, the controllers 90a and 90b are Pacific Scientific (brand) Servo Amp Controllers.

Accordingly, when the conveyor assembly of the present invention is utilized, a plurality of bags are fed from the infeed belt 10 onto the diverter belt 22. The sensor 40, which in the preferred embodiment is a photocell, is positioned a distance P from the end of the diverter belt 22 sufficient to sense the arrival of product onto the diverter belt 22 early enough to adjust the speed of the pick belts 70 and 80 to provide the desired spacing. The distance P is also selected to be great enough to allow the sensing of product on the diverter belt 22 early enough to permit resumption of the speed of a pick belt (70 or 80) after it has been stopped for depositing product as will be described below. In the preferred embodiment, wherein bags are supplied at approximately 150 bags per minute and the diverter belt moves at a speed of approximately 46 inches per second, the distance P is approximately 31 inches.

The sensor 40 is connected to the controller 95. The controller 95 is also operatively connected with the encoder 28 (which is associated with the diverter drive motor assembly 30), the controller 90A (which is operatively associated with the servo motor 74) and the controller 90B (which is operatively associated with the servo motor 85). The sensor photocell 40 detects the leading edge of each bag of product, and sends a signal to the controller 95. This information, together with the information from the encoder 28 enables the computation of the spacing between bag 1 and bag 2, which spacing is designated in the drawing as "IS" for initial spacing. Using the ratios and formula described above, the controller 95 then directs the appropriate servo motor controller to index the appropriate pick belt at a selected speed in order to provide the desired spacing (designated "DS" for the products shown in FIG. 3 on pick belt 80) between products for removal by the vacuum heads as shown in FIG. 3. In the preferred embodiment, the positional accuracy of the bags on the pick belt is enhanced by continually updating, approximately every ten milliseconds, the speed of the pick belt using the formula described above in order to enhance the accuracy of the indexing of the pick belt to provide the desired spacing DS. Moreover, while accurate spacing is enhanced by a uniform supply of product, as will be appreciated from the present disclosure, the conveyor apparatus of the present invention also provides the means for adjusting speed of the pick belt in response to random supply of product from the infeed belt 10.

In the preferred utilization of the conveyor system of the present embodiment, this process of accurately spacing bags is repeated until a desired number of product is collected on a pick belt such as is shown on pick belt 80 in FIG. 3. The controller 95 then instructs the controller 43 to cause the indexer servo motor 46 to be actuated to index the diverter belt 22 to align with the opposite pick belt from the pick belt on which the desired quantity of products has been collected. At the same time, the pick belt on which the products have been collected (in FIG. 3 shown as pick belt 80) is selectively indexed to align the products with the anticipated position of the gantry robot vacuum heads and stopped. The operation of the first pick belt, pick belt 70 (which had been stopped for removal of product in the example shown in FIG. 3), is resumed in order to accommodate the selective indexing of product on the pick belt 70. The products are then removed from pick belt 80 while products are being selectively deposited and spaced on pick belt 70. This process is repeated sequentially until a desired quantity of products is handled.

An advantage of the present invention is that the use of dual pick belts 70 and 80 provides a time gap during which a gantry robot assembly 100 can remove product from a stationary pick belt while the other pick belt is indexing product into position. The use of the diverter belt 22 and the first and second pick belts 70 and 80 therefore creates the timing necessary to permit continual operation of the gantry robot 100 for placement of product into a case without delaying or ceasing the feed of the product from the infeed conveyor belt 10. In particular, when bags are being supplied every 0.4 seconds such as contemplated by the application for which the present invention was created, the use of the diverter and the parallel pick belts creates a time gap of 4 times 0.4 seconds, or 1.6 seconds. This is a sufficient time for a typical gantry robot assembly to descend, pick up product, and deposit it in a case. Without the use of the diverter and parallel pick belts, incoming product would be running into stationary product as shown in FIG. 1.

The instant invention has been disclosed in connection with a specific embodiment. However it would be apparent to those skilled in the art that variations from the illustrated embodiment may be undertaken without departing from the spirit and scope of the invention. For example, a different mechanism may be used to remove product from the respective pick belts, such as a bar for pushing the products into a case. Alternatively, for shorter bags of product, positional accuracy may be increased by reducing the distance DS between bags on the pick belts to double the number of products diverted to a pick belt. Half of the product would be removed by a first pass of the gantry robot. The pick belt would then be indexed ½ DS and the other half would be removed by a second pass of gantry robot. These and other variations will be apparent to those skilled in the art in view of the above disclosure and are within the spirit and scope of the invention.

As used in the specification and in the appended claims, it should be understood that the words "connect" or any derivative thereof implies not only a direct, immediate connection between two recited parts, but also embraces the various arrangements wherein the parts are operatively connected, although other elements may be physically located or eliminated between the connected parts. Further, the word "a" does not preclude the presence of a plurality of elements that accomplish in the same function.

What is claimed is:

1. A conveyor assembly for providing selectively spaced products for packing cases, comprising:
    (a) a feed conveyor belt for supplying products;
    (b) first and second pick conveyor belts;
    (c) a diverter conveyor belt positioned between the feed conveyor belt and the first and second pick conveyor belts and adapted to selectively route products from the feed conveyor belt to the first pick conveyor belt and the second pick conveyor belt;
    (d) a first pick belt motor operatively connected with the first pick belt for controlling the speed of the first pick belt;
    (e) a second pick belt motor operatively connected with the second pick belt for controlling the speed of the second pick belt;
    (f) a sensor operatively associated with the diverter belt for sensing product as it passes on the diverter belt; and
    (g) a controller connected to the sensor and to the first and second pick belt motors for selectively varying the speed of the first and second pick belt motors to provide a desired spacing of products on the first and second pick belts.

2. The conveyor assembly of claim 1 wherein said sensor is a photo cell.

3. The conveyor assembly of claim 1, wherein the first and second pick belts are positioned substantially parallel to each other and wherein the diverter belt is adapted to selectively align with either the first pick belt or the second pick belt in order to selectively deliver product to either the first pick belt or the second pick belt.

4. The conveyor assembly of claim 3 further comprising a first diverter motor operatively connected with the diverter belt for controlling the speed of the diverter belt, wherein the processor controller is connected to the first diverter motor for selectively varying the speed of the first and second pick belt motors relative to the speed of the first diverter motor to provide a desired spacing of products on the first and second pick belts.

5. The conveyor assembly of claim 4 further comprising a gantry robot vacuum head assembly including a plurality of robot vacuum heads selectively spaced and positioned in a line, the assembly being adapted to move sequentially from a first position over the first pick belt, to a second position over a row of cases, to a third position over a second pick belt, and then to substantially the second position over the row of cases in order to allow the vacuum head assembly to lift products off the first pick belt and deposit them into cases, and then lift products off the second pick belt and deposit them into cases.

6. The conveyor assembly of claim 4, wherein the controller is adapted to make frequent periodic adjustments to the first and second pick belt motor speeds in order to accurately adjust for random spacing of products on the feed and diverter belts.

7. A conveyor system for providing selectively spaced products for packing in cases, comprising:
    a diverter belt assembly, comprising a diverter belt and a diverter belt motor operatively associated with the diverter belt for driving the diverter belt;
    a pick conveyor belt assembly, comprising a pick conveyor belt and a pick conveyor belt motor operatively associated with the pick conveyor belt for selectively driving the pick conveyor belt, the pick conveyor belt being operatively aligned with the diverter belt for receiving products from the diverter belt;
    a sensor operatively associated with the diverter belt and operable to sense the position of a product on the diverter belt;
    an encoder operatively associated with the diverter belt motor and operable to determine the speed of the diverter belt; and
    a controller operatively coupled to the pick belt motor, the encoder, and the sensor, and adapted to vary the speed of the pick belt motor relative the speed of the diverter belt and position of a product on the diverter belt to selectively space products on the pick conveyor belt.

8. The conveyor system of claim 7, wherein the controller is operable to repeatedly increase or decrease the speed of the pick belt motor in response to the presence or absence of product on the diverter belt in order to adjust the travel of the pick conveyor belt to provide the desired spacing.

9. A system for spacing products on a conveyor assembly, comprising:
    dual pick belts, wherein said pick belts are parallel with each other;
    a diverter operable to selectively distribute products to said pick belts;
    a sensor for determining information about the arrival of products to the diverter; and
    a controller operatively coupled to said sensor, said diverter, and said pick belts, wherein
        said controller is operable to adjust the desired operating speed of said pick belts based on information about the arrival of products to the diverter.

10. A method for providing selectively spaced products on a conveyor assembly, comprising the steps of:
    a) transporting a plurality of products on a feed conveyor belt to a diverter belt;
    b) aligning the diverter belt with a first pick belt for delivery of a selected number of products to the first pick belt while;
    c) advancing the first pick belt at a desired speed to provide selected spacing between products on the first pick belt, wherein providing selected spacing comprises
        sensing the position of a product on the diverter belt,
        determining the speed of the diverter belt, and
        adjusting the desired speed of the first pick belt;
    d) once the select number of products has been delivered to the first pick belt, aligning the diverter belt with a second pick belt for delivery of a second selected number of products to the second pick belt; and e) advancing the second pick belt at a desired speed to provide selected spacing between products on the second pick belt wherein providing selected spacing comprises sensing the position of a product on the diverter belt, determining the speed of the diverter belt, and adjusting the desired speed of the second pick belt.

11. A system for selectively spacing products for packing in cases, comprising:

a conveyor assembly operable to deliver products;

a sensor operable to detect the position of a product on the conveyor assembly;

a first pick off belt assembly adapted to be operable at a desired speed in order to selectively space products on the first pick off belt;

a second pick off belt assembly adapted to be operable at a desired speed in order to selectively space products on the second pick off belt;

a controller operable to selectively adjust the desired speed of the first and second pick off belts; and a diverter assembly operable to selectively divert products to the first and second pick off belt assemblies.

12. The system of claim 11, further comprising:

an encoder operable to determine the speed of the diverter belt, wherein the controller is operatively connected to the sensor and the encoder and is operable to selectively adjust the desired speed of the first and second pick off belts.

13. The system of claim 11, further comprising a product removal mechanism operatively associated with the first pick off belt and second pick off belt.

14. The system of claim 13, wherein the product removal mechanism comprises a plurality of robotic vacuum heads.

15. The system of claim 13, wherein the controller is operable to selectively adjust the desired speed of the first pick off belt and second pick off belt to selectively space the products on the first and second pick off belts.

* * * * *